US007871227B2

(12) United States Patent
Adamczak et al.

(10) Patent No.: US 7,871,227 B2
(45) Date of Patent: Jan. 18, 2011

(54) AUXILIARY DEVICE FOR A HAND-HELD POWER TOOL

(75) Inventors: Wolfgang Adamczak, Stuttgart (DE); Marco Braun, Stuttgart (DE); Zaidi Ahmad Mohd, Merbok (MY); James B. Stevens, Oak Park, IL (US)

(73) Assignee: Robert Bosch GmbH, Stuttgart (DE)

(*) Notice: Subject to any disclaimer, the term of this patent is extended or adjusted under 35 U.S.C. 154(b) by 422 days.

(21) Appl. No.: 11/908,813

(22) PCT Filed: Oct. 5, 2006

(86) PCT No.: PCT/EP2006/067099

§ 371 (c)(1), (2), (4) Date: Sep. 17, 2007

(87) PCT Pub. No.: WO2007/054408

PCT Pub. Date: May 18, 2007

(65) Prior Publication Data

US 2008/0199269 A1 Aug. 21, 2008

(30) Foreign Application Priority Data

Nov. 8, 2005 (DE) ....................... 10 2005 053 534

(51) Int. Cl.

*B23C 1/20* (2006.01)
*B27C 5/10* (2006.01)
*B23Q 5/20* (2006.01)

(52) U.S. Cl. ....................... 409/182; 409/231; 409/134; 279/148

(58) Field of Classification Search ................ 409/231, 409/134, 182, 175, 180, 232, 234, 181; 408/238, 408/239 R, 240, 197; 144/136.95, 154.5; 279/125, 147–148

See application file for complete search history.

(56) References Cited

U.S. PATENT DOCUMENTS 2,777,340 A 1/1957 Hettwer et al.

(Continued)

FOREIGN PATENT DOCUMENTS

CA 2 255 183 6/1999

(Continued)

*Primary Examiner*—Erica E Cadugan
(74) *Attorney, Agent, or Firm*—Michael J. Striker

(57) ABSTRACT

The invention relates to an auxiliary device for a portable tool, comprising a receptacle (2) for a motor-operated portable tool (22) having an output shaft (26), and comprising a drive train (9) which has a tool receptacle (8), to be opened and closed by rotation, and which can be connected to the output shaft (26) of the motor-operated portable tool (22) via a coupling device. Provision is made for the auxiliary device (1) for the portable tool to have an anti-rotation locking means (13) acting on the drive train (9).

14 Claims, 4 Drawing Sheets

U.S. PATENT DOCUMENTS

| | | | | |
|---|---|---|---|---|
| 3,111,969 | A * | 11/1963 | Bivens | 30/373 |
| 3,454,061 | A | 7/1969 | Cordone et al. | |
| 3,494,395 | A * | 2/1970 | Graham | 144/136.95 |
| 4,400,995 | A | 8/1983 | Palm | |
| 4,461,330 | A * | 7/1984 | Judkins | 144/154.5 |
| 4,827,996 | A * | 5/1989 | Cotton et al. | 144/154.5 |
| 5,013,195 | A | 5/1991 | Strazar | |
| 5,013,196 | A * | 5/1991 | Friegang | 409/182 |
| 5,902,080 | A | 5/1999 | Kopras | |
| 6,042,310 | A * | 3/2000 | Campbell et al. | 409/182 |
| 6,139,228 | A | 10/2000 | Longo | |
| 6,224,304 | B1 * | 5/2001 | Smith et al. | 409/182 |
| 6,846,138 | B1 * | 1/2005 | Phillips et al. | 409/182 |
| 7,073,606 | B2 | 7/2006 | Mamber et al. | |
| 7,448,420 | B2 * | 11/2008 | Mair | 144/136.95 |
| 7,455,488 | B2 | 11/2008 | Carlson et al. | |
| 2002/0153147 | A1 | 10/2002 | Mamber et al. | |
| 2002/0197123 | A1 * | 12/2002 | Kopras et al. | 409/182 |
| 2007/0065245 | A1 | 3/2007 | Carlson et al. | |

FOREIGN PATENT DOCUMENTS

| | | |
|---|---|---|
| CH | 656 567 | 7/1986 |
| DE | 32 34 254 | 4/1983 |
| DE | 100 29 898 | 12/2001 |
| DE | 103 59 420 | 7/2005 |
| EP | 0 034 713 | 9/1981 |
| EP | 0 924 038 | 6/1999 |
| EP | 0920 950 | 6/1999 |
| WO | 2005/058542 | 6/2005 |

* cited by examiner

AUXILIARY DEVICE FOR A HAND-HELD POWER TOOL

RELATED ART

The present invention relates to an auxiliary device for a hand-held power tool with a fitting for a motor-operated, hand-held power tool having a drive shaft, and with a drive train which includes a tool fitting, which is rotated to be opened or closed, and which can be connected to the output shaft of the motor-operated, hand-held power tool via a coupling device.

An auxiliary device for a hand-held power tool of this type is known. It includes a fitting, into which a motor-operated, hand-held power tool is inserted, in order to connect these two parts with each other, e.g., via clamping, such that they can be operated reliably. The auxiliary device for a hand-held power tool also includes a separate drive train—with a tool fitting—driven by the motor-operated, hand-held power tool. An auxiliary device for a hand-held power tool of this type is used to guide the tool fitting provided with a tool; the tool is displaced to a position that is independent of the position of the motor-operated, hand-held power tool. The drive train and the tool may need to be displaced, e.g., to reach a working region of a workpiece that is difficult to access with the motor-operated, hand-held power tool. To displace the tool, the output shaft of the motor-operated, hand-held power tool is coupled with the drive train via a coupling device, e.g., a belt drive with pulleys or a shaft with gears. An auxiliary device for a hand-held power tool of this type also makes it possible to use the hand-held power tool in many different ways.

In many cases, with a tool fitting that is rotated in order to be opened or closed, two components of the tool fitting must be pulled tightly against each other or released from each other via the act of rotation. Two tools are typically required in order to attain the level of torque required.

ADVANTAGES OF THE INVENTION

The inventive auxiliary device for a hand-held power tool includes an anti-rotation locking device which engages with the drive train. It acts directly and in a non-rotatable manner on the drive train—which includes the tool fitting—and replaces one of the tools that are otherwise required to open or close the tool fitting. As such, a tool can be replaced—and the insertion depth of a tool in the tool fitting can be adjusted—easily, comfortably, and reliably.

The anti-rotation locking device preferably includes an anti-rotation lock, which is axially displaceable and acts on the drive train. This configuration results in a slender design of the displaced drive train.

According to a preferred embodiment, the coupling device is designed as a belt drive. It is characterized by simple handling, quiet running, and light weight. By designing the belt as a toothed belt that meshes with the toothed belt pulleys, the torque of the motor-operated, hand-held power tool can be transferred to the drive train in a defined manner.

According to a refinement of the present invention, it is provided that the auxiliary device for a hand-held power tool includes a workpiece-supporting device. It serves to position and guide the tool relative to the workpiece and to position and guide the tool relative to the auxiliary device for a hand-held power tool. To this end, the workpiece-supporting device includes at least one bearing surface, via which the auxiliary device for a hand-held power tool can be guided on the workpiece, or vice versa. If the motor-operated, hand-held power tool is a router, for example, the auxiliary device for a hand-held power tool can be designed such that the router bit is driven, e.g., by the drive train, which is located above the bearing plane, even though it is located entirely or partially below the bearing surface, so that the distance between the end of the router bit and this plane defines a cutting depth.

In particular, it is provided that the workpiece-supporting device is height-adjustable. In this context, "height-adjustable" means that the distance of the tool relative to the bearing surface can be varied. To this end, e.g., the distance can be varied by a fitting and drive train of the auxiliary device for a hand-held power tool—which form one component—relative to the bearing surface of the workpiece-supporting device.

According to a refinement of the present invention, it is provided that the drive train is enclosed in a protective housing. The protective housing protects the surroundings from hazards that arise from the rapidly-rotating parts of the drive train, and it protects the drive train from external influences, such as contamination. It is possible, in particular, to design the bearing of the drive train such that it is electrically insulating.

In particular, it is provided that the protective housing is designed as a handle. This additional handle is suited for precisely guiding the drive train with the tool.

Furthermore, it is advantageous when the protective housing is designed to provide insulation against heat produced during operation, so that the protective housing can also serve as a handle, e.g., during high rotational speeds of the drive train.

According to a refinement of the present invention, it is provided that the protective housing and the drive train are located such that they are laterally offset from the fitting. With a design of this type, it is ensured that inaccessible parts of the workpiece that cannot be reached with the motor-operated, hand-held power tool can be worked.

The drive train is preferably located such that it is offset from and parallel with the output shaft of the motor-operated, hand-held power tool located in the fitting, thereby making it possible to use a simple, economical coupling device, such as a belt drive, for coupling the drive train and the output shaft of the motor-operated, hand-held power tool.

In particular, it is provided that the drive train includes a polygon which interacts with a non-rotatable locking element, which is supported in an axially displaceable manner in the housing, in a form-fit manner in the locked position.

The polygon is preferably located on the end of the drive train opposite to the tool fitting.

In a refinement of the present invention, the auxiliary device for a hand-held power tool includes a manual actuating element, which acts on the locking element and is displaceably supported in the housing. It is located as close to the anti-rotation locking device as possible, in order to operate the anti-rotation locking device and to design the triggering mechanism to be as simple and direct as possible.

It is possible, in particular, that the drive train is electrically insulated by the protective housing. To this end, the bearing of the drive train is designed to be electrically insulating, or an electrically insulating layer is located between the protective housing and the drive train with layers that enclose the drive train as completely as possible. The anti-rotation locking device also includes electrically insulating elements, which enclose the drive train in an electrically insulating manner. If the drive train has high electrical potential, e.g., because the tool has damaged an electrical line such as a power cable, the operator is not placed at risk of electric shock.

DRAWING

The present invention is explained below in greater detail in an exemplary embodiment, with reference to the attached drawing.

Figure 1:
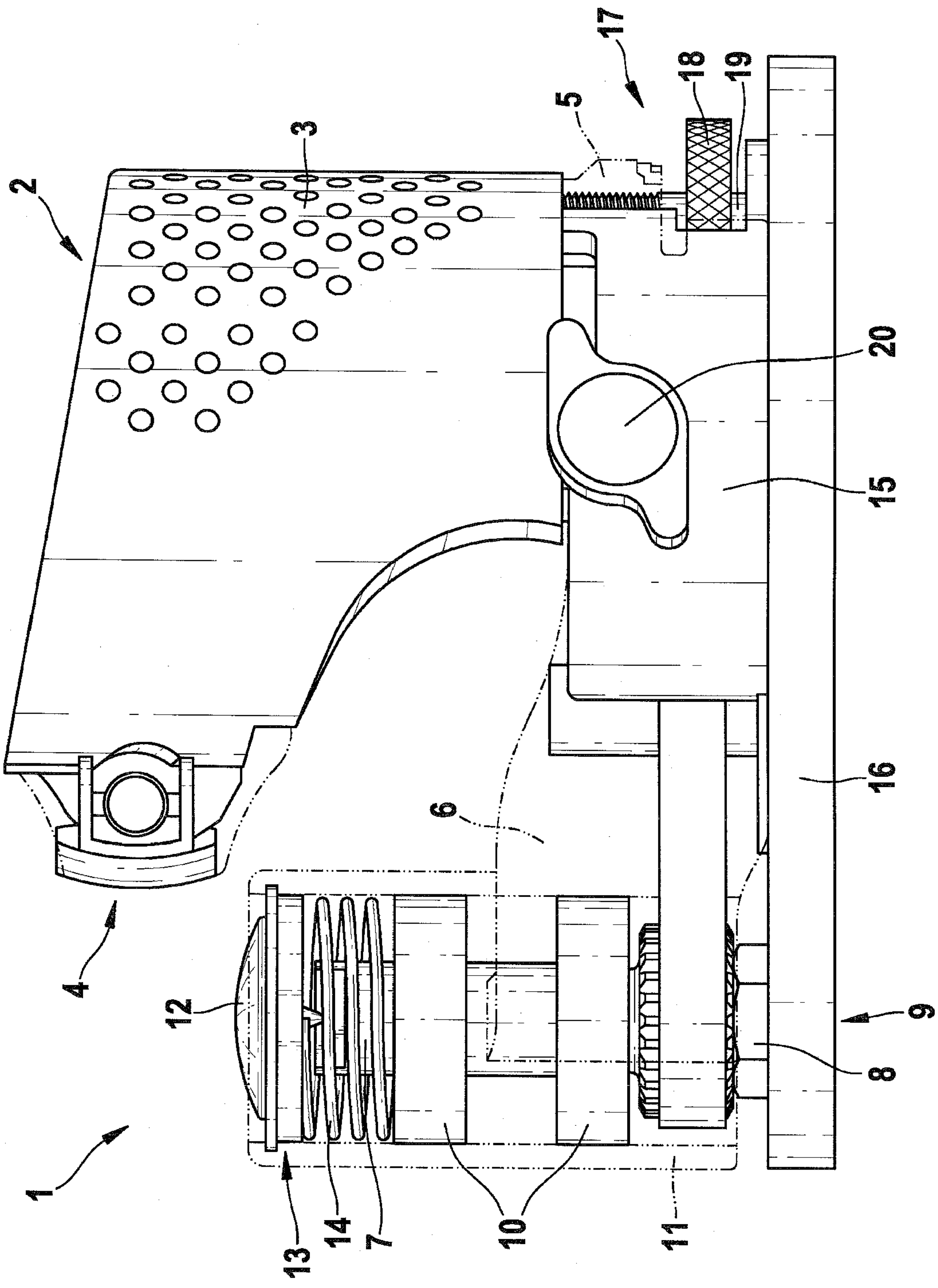
FIG. 1 shows a side view of an auxiliary device of a hand-held power tool.

An auxiliary device of a hand-held power tool 1 for a not-shown motor-operated, hand-held power tool is shown in FIG. 1. Cuff 3, which serves as receptacle 2 for motor-operated, hand-held power tool, includes a clamping device 4 on one end for clamping cuff 3 to the motor-operated, hand-held power tool. A fastening ring 5 with a radially outwardly extending, cantilever arm 6—on the end of which a rotatably supported shaft 7 is located—is located at the other end of cuff 3. A tool fitting 8 for accommodating a not-shown tool is located on one end of shaft 7. Shaft 7 and tool fitting 8 belong to a drive train 9 for driving the tool. Drive train 9 is rotatably supported by bearings 10 in a housing 11, which is connected with cantilever arm 6 as a single piece. An anti-rotation locking device 13, which can be actuated with a manual actuating element 12, is located on the end of drive train 9 opposite to tool fitting 8, and it is held in the non-triggered state by a coiled spring 14 while the tool is operated. Fastening ring 5 of auxiliary device of a hand-held power tool 1 is supported in an axially displaceable manner on an annular pedestal 15, which is enclosed entirely by fastening ring 5. Pedestal 15 is connected on the side opposite to cuff 3 with a base plate 16, with which it forms a workpiece-supporting device 17. To adjust the height of cuff 3 and fastening ring 5 with cantilever arm 6 and drive train 9 relative to workpiece-supporting device 17—which is composed of pedestal 15 and base plate 16—at least one adjusting screw 18 is located on the side of fastening ring 5 opposite to cantilever arm 6, which engages in a not-shown thread of fastening ring 5. To lock-in the height, two immobilizing screws 20 are provided on the sides of pedestal 15, which extend through slots in fastening ring 5 oriented in the direction of the height adjustment and which can be screwed tightly, thereby securing fastening ring 5 in place on pedestal 15.

Figure 2:
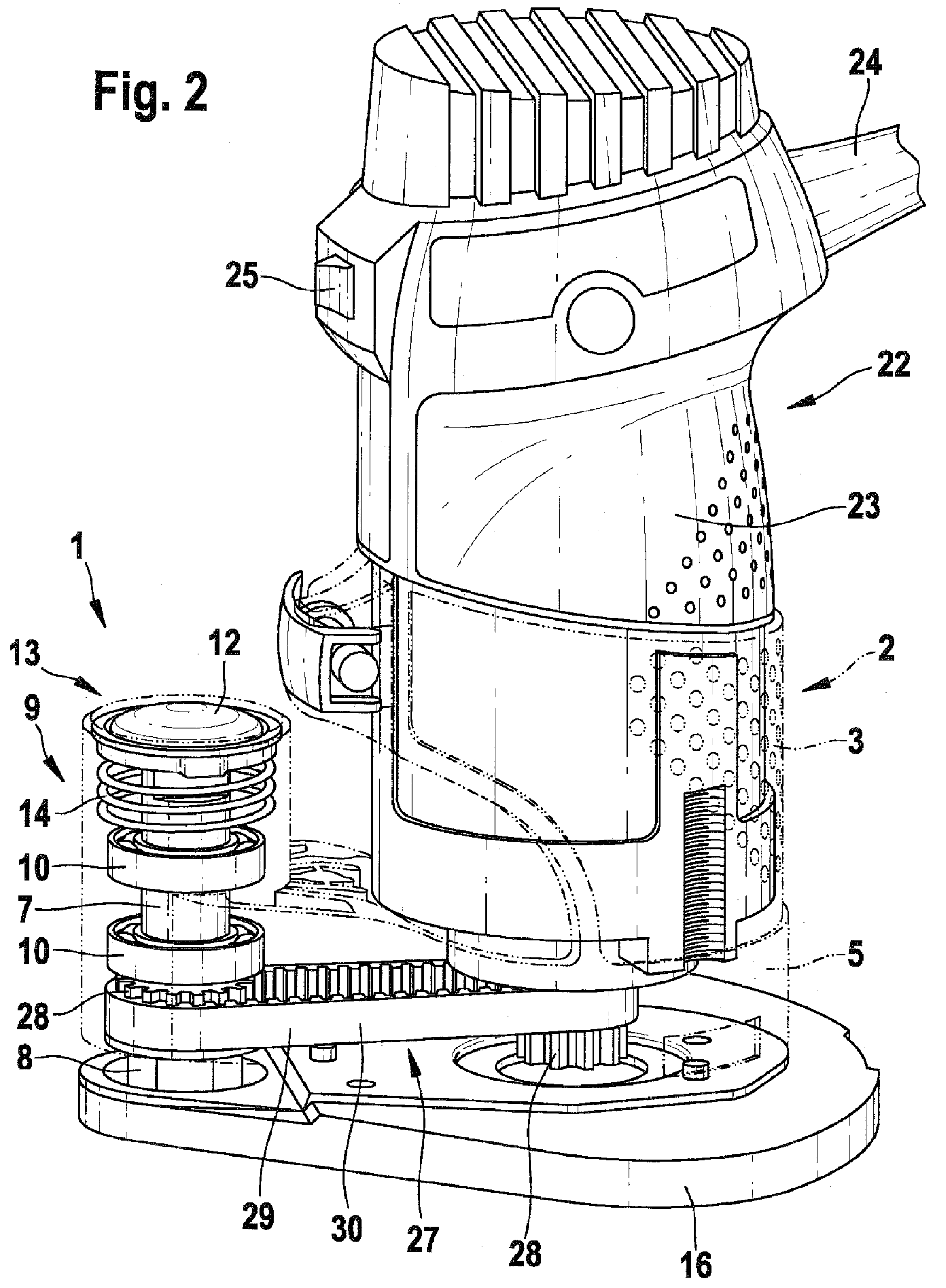
FIG. 2 shows a side view of a router—which is the motor-operated, hand-held power tool—with an auxiliary device of a hand-held power tool.

FIG. 2 shows the auxiliary device of a hand-held power tool with a motor-operated, hand-held power tool 22—designed as a router 23—located in fitting 2. In an upper end region, router 23 includes a connection of a power cord 24 on one side, and an on/off switch 25 on the opposite side. The output shaft of the router is located on the opposite end; a tool fitting is located on the output shaft of the router when it is operated without auxiliary device of a hand-held power tool 1. When the router is operated with auxiliary device of a hand-held power tool 1, the tool fitting is replaced with a pulley 28, which drives a belt drive. Belt drive 27 drives—via a further pulley 28—drive train 9 with tool fitting 8. To prevent belt 29 from slipping and to increase the torque on the not-shown milling head, the belt can be designed as toothed belt 30, which meshes with the teeth of pulleys 28.

Figure 3:
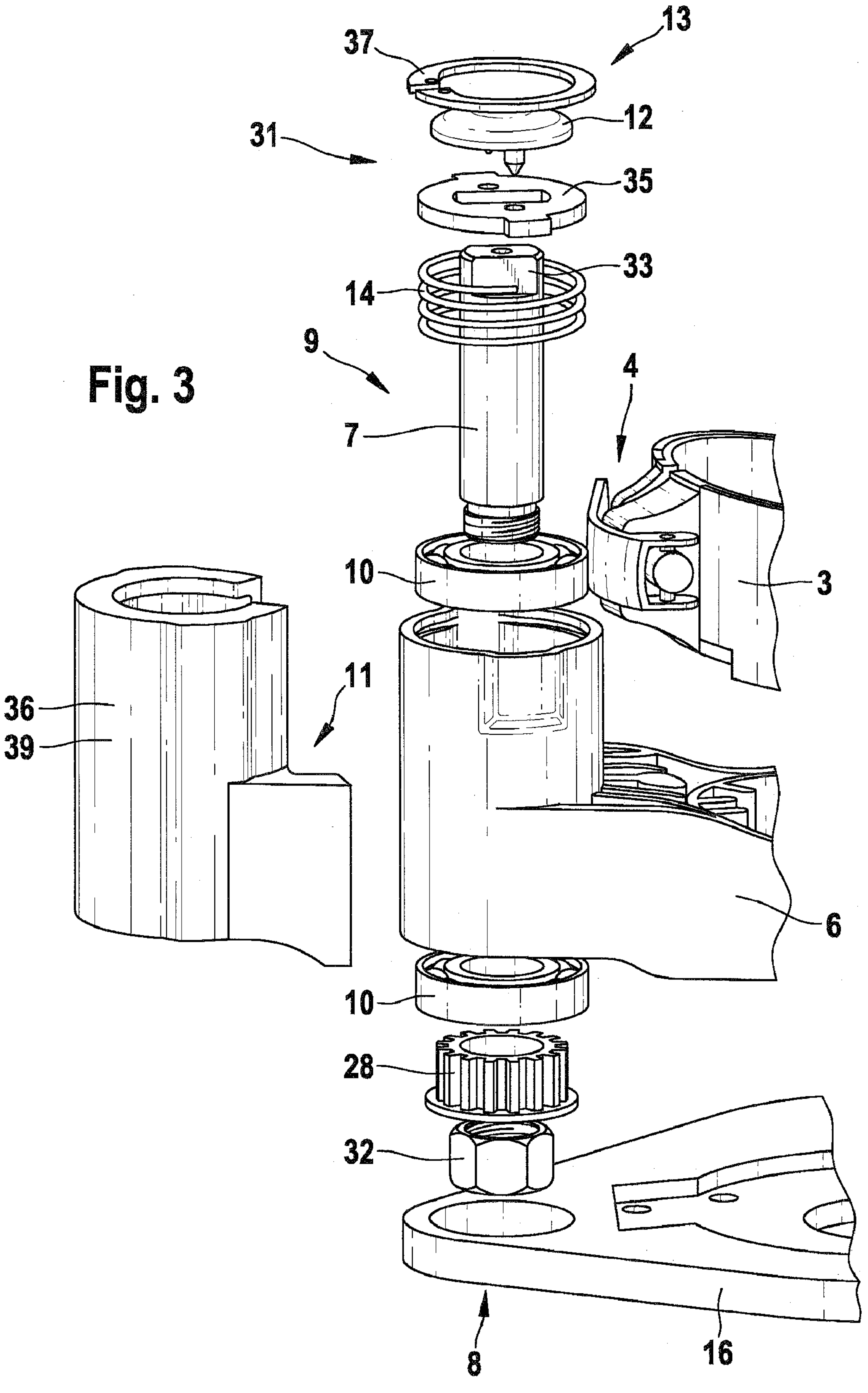
FIG. 3 shows an exploded view of a drive train of the auxiliary device of a hand-held power tool.

FIG. 3 shows—in an exploded view—the assembly of drive train 9 on cantilever arm 6, and the assembly of anti-rotation locking device 13 with an axially displaceable anti-rotation lock 31, which acts on the drive train. Shaft 7 of drive train 9 is rotatably supported in housing 11 with bearings 10. Tool fitting 8 is located at one end of shaft 7 and accommodates a router bit for a router 23 as the tool with auxiliary device of a hand-held power tool 1 depicted here. Tool fitting 8 depicted here is opened, closed, and fixed in position by rotating lock nut 32 relative to shaft 7. Pulley 28—via which entire drive train 9 is driven—is located on shaft 7, directly adjacent to tool fitting 8. On the side of drive train 9 opposite to tool fitting 8, shaft 7 shown in FIG. 4 includes a polygon 34 designed as a rectangle 33, with which anti-rotation lock 31 of anti-rotation locking device 13 can cooperate. To ensure that anti-rotation lock 31 does not cooperate with auxiliary device of a hand-held power tool 1 during normal operation of motor-operated, hand-held power tool 22, a coiled spring 14 surrounds the end of drive train 9 with rectangle 33 and presses a locking element 35 and manual actuating element 12 axially against an end ring 37 of housing 11, thereby ensuring that these parts have axial clearance from drive train 9. When manual actuating element 12 is actuated, non-rotatably supported locking element 35 is slid over polygon 33—when drive train 9 is in the corresponding rotational position—in order to cooperate therewith in a form-fit manner. Since locking element 35 is non-rotatably supported in housing 11, drive train 9 can no longer be rotated with tool fitting 8 in this rotationally locked position. If, e.g., the not-shown router bit is to be replaced or its position in tool fitting 8—which is rotated to be opened or closed—is to be changed, this can be accomplished simply by rotating lock nut 32. A separate tool for counter-rotating drive train 9 is not necessary, thanks to anti-rotation locking device 13.

Figure 4:
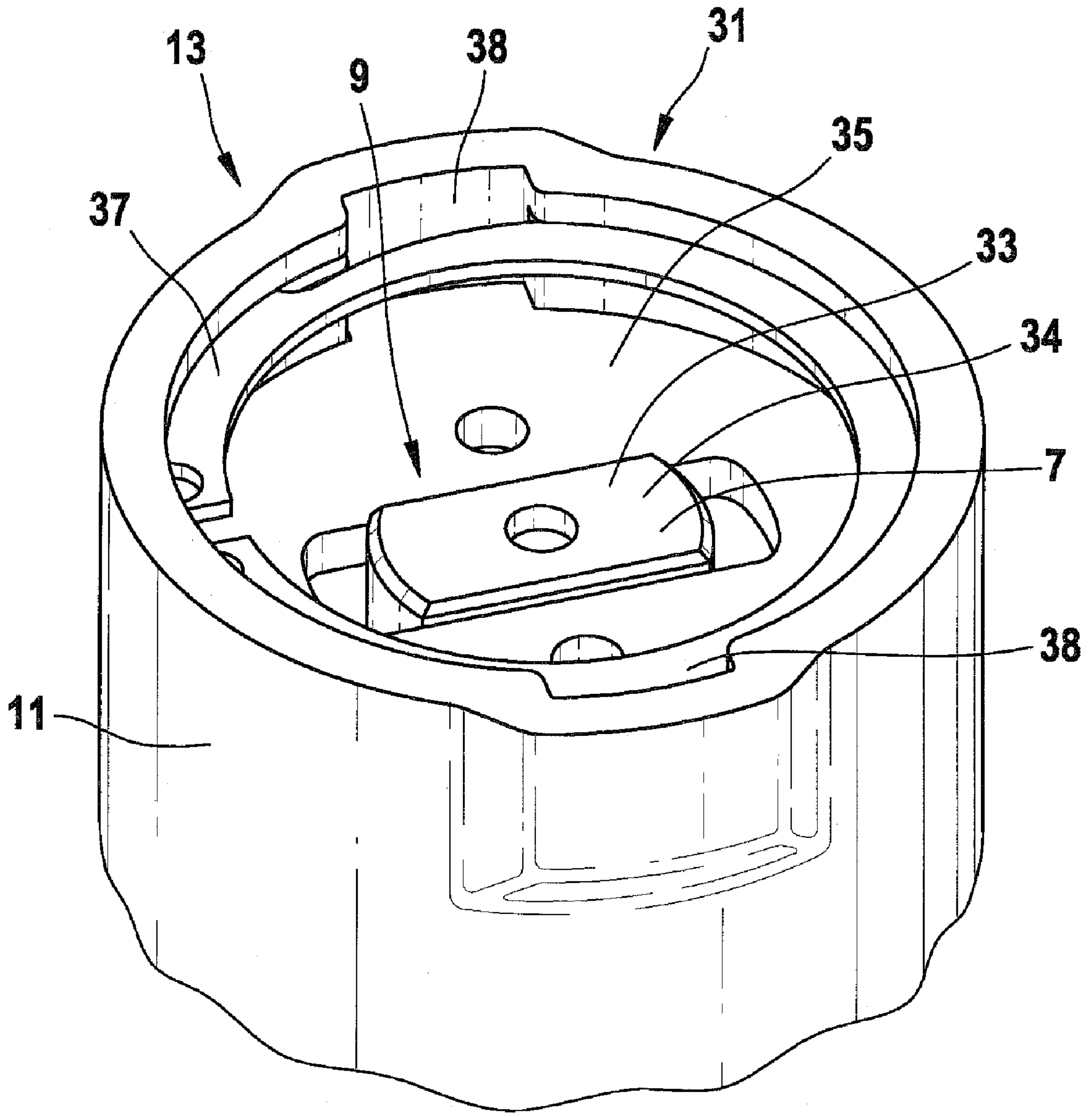
FIG. 4 shows a detailed drawing of an anti-rotation locking device, which engages with the drive train.

FIG. 4 shows, in detail, the interaction of polygon 34—designed as rectangle 33—on the end of drive train 9 with locking element 35, which is supported in housing 11 in a non-rotatable, axially supported manner by grooves 38. Matching projections of locking element 35 engage in grooves 38. When not-shown manual actuating element 12 is actuated, and when drive train 9 is in the suitable rotational position—which is attained with this design by rotating drive train 9 by 180°—drive train 9 can be locked in position.

The height adjustment of auxiliary device for a hand-held power tool 1 using adjusting screw 18 is designed such that adjusting screw 18—supported by a pin 19 in pedestal 15—is located between pedestal 15 and fastening ring 5. The head of adjusting screw 18, which is designed as a knurled screw, is easy to access from the outside via a recess in fastening ring 5. The threaded element of adjusting screw 18 is located between a semi-circular, axially extending groove on the outer surface of pedestal 15 and a semi-circular groove provided with a thread inside fastening ring 5 enclosing pedestal 15. The adjusting screw engages in the thread of fastening ring 5, thereby enabling fastening ring 5 to be raised or lowered by rotating the adjusting screw. Adjusting screw 18 is not only guided via pin 19 secured in pedestal 15, it is also supported by a compression spring that surrounds it and reduces the friction between pedestal 15 and adjusting screw 18.

What is claimed is:

1. An auxiliary device for a hand-held power tool, the auxiliary device including a fitting for releasable holding a motor-operated, hand-held power tool having a drive shaft, the auxiliary device also including a drive train which includes a tool fitting, which tool fitting is rotated to be opened or closed, and which drive train includes a rotatable shaft (7) that is parallel to the drive shaft and that can be rotationally connected to the drive shaft of the motor-operated, hand-held power tool via a coupling device, the auxiliary device further comprising an anti-rotation locking device (13), which acts on the drive train (9), wherein the anti-rotation locking device (13) includes a non-rotatable locking element (35), wherein the rotatable shaft (7) includes a polygonal portion which interacts with the non-rotatable locking element (35) to rotationally lock the drive train (9) when the non-rotatable locking element (35) is moved in the direction of the rotational axis of the rotatable shaft (7).

2. The auxiliary device for a hand-held power tool as recited in claim 1, wherein the non-rotatable locking element (35) includes an opening that slides over the polygonal portion as the non-rotatable locking element (35) is moved in the direction of the rotational axis of the rotatable shaft (7).

3. The auxiliary device for a hand-held power tool as recited in claim 1, wherein the coupling device is designed as a belt drive (27).

4. The auxiliary device for a hand-held power tool as recited in claim 1, further comprising a workpiece-supporting device (17) for supporting the auxiliary device against a workpiece.

5. The auxiliary device for a hand-held power tool as recited in claim 4, wherein the workpiece-supporting device (17) is height-adjustable.

6. The auxiliary device for a hand-held power tool as recited in claim 1, wherein the drive train (9) is enclosed in a protective housing (36).

7. The auxiliary device for a hand-held power tool as recited in claim 6, wherein the protective housing (36) is designed as a handle (39).

8. The auxiliary device for a hand-held power tool as recited in claim 6, wherein the protective housing (36) is designed to insulate against heat produced during operation.

9. The auxiliary device for a hand-held power tool as recited in claim 6, wherein the protective housing (36) is located such that it is laterally offset from the fitting (2) for releasably holding the motor-operated, hand-held power tool.

10. The auxiliary device for a hand-held power tool as recited in claim 6, further comprising a manual actuating element (12), which acts on the locking element (35) and is displaceably supported in the housing (36).

11. The auxiliary device for a hand-held power tool as recited in claim 6, wherein the drive train (9) is electrically insulated by the protective housing (36).

12. The auxiliary device for a hand-held power tool as recited in claim 1, wherein the drive train (9) is located such that it extends parallel to the drive shaft of the motor-operated hand-held power tool (22) located in the fitting (2) for releasably holding the motor-operated, hand-held power tool.

13. The auxiliary device for a hand-held power tool as recited in claim 1, wherein the polygonal portion (33) interacts with the non-rotatable locking element (35) in a form-fit manner.

14. The auxiliary device for a hand-held power tool as recited in claim 1, wherein the polygonal portion (33) is located on the end of the drive train (9) opposite to the tool fitting (8).

* * * * *